United States Patent
Campillo Jara et al.

(10) Patent No.: US 10,183,241 B2
(45) Date of Patent: Jan. 22, 2019

(54) OPEN FILTRATION DEVICE FOR A WATER TREATMENT STATION

(71) Applicant: EMPRESA MUNICIPAL DE AGUAS Y SANEAMIENTO DE MURCIA, S.A., Murcia (ES)

(72) Inventors: Domingo Campillo Jara, Murcia (ES); Marcos Martin Gonzalez, Murcia (ES)

( * ) Notice: Subject to any disclaimer, the term of this patent is extended or adjusted under 35 U.S.C. 154(b) by 476 days.

(21) Appl. No.: 14/783,733

(22) PCT Filed: Apr. 1, 2014

(86) PCT No.: PCT/ES2014/070249
§ 371 (c)(1),
(2) Date: Oct. 9, 2015

(87) PCT Pub. No.: WO2014/167152
PCT Pub. Date: Oct. 16, 2014

(65) Prior Publication Data
US 2016/0067633 A1 Mar. 10, 2016

(30) Foreign Application Priority Data
Apr. 10, 2013 (ES) .................................. 201330510

(51) Int. Cl.
*B01D 24/22* (2006.01)
*B01D 24/24* (2006.01)
*B01D 24/46* (2006.01)

(52) U.S. Cl.
CPC ............. *B01D 24/22* (2013.01); *B01D 24/24* (2013.01); *B01D 24/4631* (2013.01)

(58) Field of Classification Search
None
See application file for complete search history.

(56) References Cited

U.S. PATENT DOCUMENTS

| 3,762,559 A | 10/1973 | Knoy |
| 4,579,659 A * | 4/1986 | Eades .................... B01D 24/12 210/293 |

(Continued)

FOREIGN PATENT DOCUMENTS

| ES | 1060660 U | 10/2005 |
| ES | 1064181 U | 2/2007 |
| WO | WO 2007/003383 | 1/2007 |

OTHER PUBLICATIONS

Supplementary European Search Report for European Application No. 14783501.1, dated Jan. 18, 2017, 6 pages.

(Continued)

Primary Examiner — Krishnan S Menon
(74) Attorney, Agent, or Firm — Nixon Peabody LLP

(57) ABSTRACT

Open filtering equipment for a water treatment station, for open filters with a filter bed such as sand, coal, etc., comprising a plurality of support legs (10), a plurality of frames (20) supported on said support legs (10), each having at least one opening (22), said plurality of frames (20) being suitable to cover the bottom of a filter, and a plurality of filtering assemblies with a flat upper surface, each of them attachable on a frame (20) covering an opening (22) thereof, and each filter assembly comprising a filtering grid (32) for filtering the water from the filter bed by filtering.

11 Claims, 4 Drawing Sheets

(56) References Cited

U.S. PATENT DOCUMENTS

| | | | |
|---|---|---|---|
| 4,619,765 A * | 10/1986 | Roberts | B01D 24/14 210/289 |
| 4,740,300 A | 4/1988 | Tapella | |
| 6,615,469 B1 | 9/2003 | Burcham | |
| 2005/0194302 A1 | 9/2005 | Roberts | |
| 2010/0251678 A1 | 10/2010 | Mann | |
| 2011/0226687 A1 | 9/2011 | Roberts | |

OTHER PUBLICATIONS

International Search Report for International Application No. PCT/ES2014/070249, dated Jun. 23, 2014, 6 pages.

Written Opinion for International Application No. PCT/ES2014/070249, dated Jun. 23, 2014, 6 pages.

* cited by examiner

OPEN FILTRATION DEVICE FOR A WATER TREATMENT STATION

CROSS-REFERENCE TO RELATED APPLICATIONS

This application is a U.S. national stage of International Application No. PCT/ES2014/070249, filed Apr. 1, 2014, which claims priority to and the benefits of Spanish Application No. P201330510, filed Apr. 10, 2013, the disclosures of which are each hereby incorporated by reference herein in their entireties.

OBJECT OF THE INVENTION

The present invention relates to the field of water treatment stations, and more particularly, to an open filtering system with filter bed, such as sand, coal, etc., for its use in open filtering applications.

BACKGROUND OF THE INVENTION

The filtering systems commonly used in water treatment stations consist of concrete slabs provided with uniformly distributed holes. Filter elements are introduced in the interior of said holes, namely nozzles, which are provided with grids to filter the water entering there through and thus achieve the separation of the water from the filter bed.

The use of such systems is fairly widespread in this technical field due to the fact that they deliver relatively good performance yields. However, it also presents an important disadvantage. The nozzle-type filter elements, for example, despite the fact of providing a homogeneous cleaning of the filter bed, get broken quite frequently and must be replaced with new filter elements, with the consequent interruption of the filtering process. A further problem is due to the filter bed losses caused by the lack of adjustment between the concrete slabs.

Therefore, in the art there is still a need for filtering equipment which overcomes the aforementioned disadvantages, specifically filtering equipment with a longer service life

DESCRIPTION OF THE INVENTION

To solve the aforementioned drawbacks, the present invention discloses open filtering equipment for application in a common water treatment station, said filtering system comprising:
- a plurality of support legs;
- a plurality of frames supported on said support legs, each presenting at least one opening, said plurality of frames being suitable to cover the bottom of a filter; and
- a plurality of filtering assemblies with a flat upper surface, each one attachable onto a frame, covering an opening thereof, each filtering assembly presenting a filtering grid for retaining the filter bed and letting the water pass.

Therefore, it can be seen that the filtering equipment according to the present invention provides a double bottom in the open filter. The upper surface provided by the filtering equipment assembly is substantially flat, without any protruding element, as in the prior art, thereby avoiding breakages and increasing the service life of the assembly. This is also due to the increased resistance of the filtering slabs with respect to the nozzles used in the state of the art.

Furthermore, the modular feature of the filtering equipment of the present invention (constituted by a plurality of frames to cover the filter bottom), allows for the easy transport of individual elements and to adapt the assembly to open filters of any size.

DESCRIPTION OF THE DRAWINGS

The present invention can be better understood with reference to the following drawings, which illustrate a preferred embodiment of the invention provided as an example, and that should not be construed as limiting in any way.

PREFERRED EMBODIMENT OF THE INVENTION

As mentioned above, the filtering equipment according to the present invention comprises, as main elements, a plurality of support legs 10, a plurality of frames 20 and a plurality of filtering assemblies.

Figure 1:
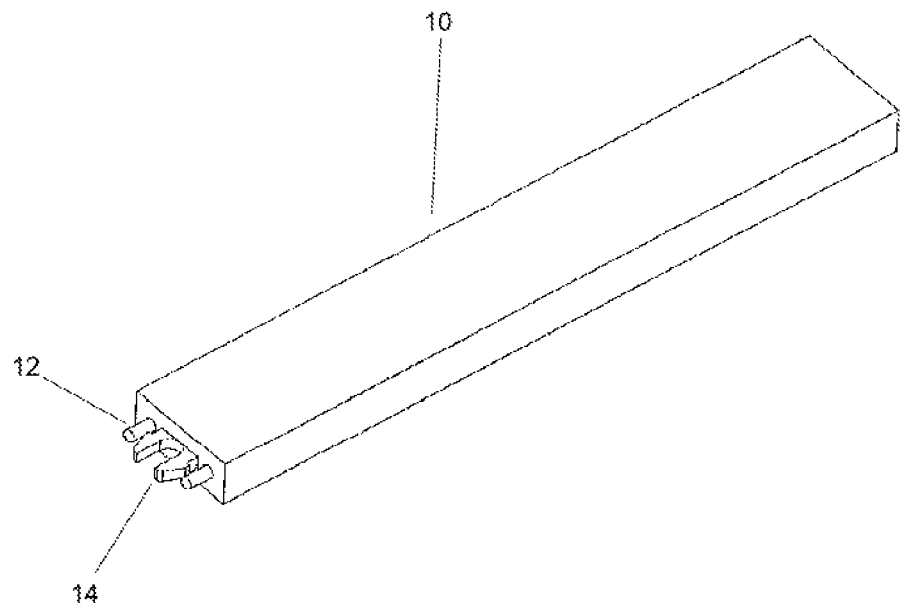
FIG. 1 shows a perspective view of a leg according to the preferred embodiment of the present invention.

Referring first to FIG. 1, a support leg 10 is shown according to the preferred embodiment of the invention. Said support leg 10 presents a rectangular prismatic body, this body comprising on one end a pair of projections 12 and flexible lugs 14 to provide a pressure coupling and a clip attachment, respectively, with a frame 20 disposed on said support leg 10, as explained below herein. Therefore, it is understood that the object of said support legs 10 is to keep the frames 20 raised above the filter bottom, thereby creating a double bottom therein where the filtered water circulates.

Figure 2:
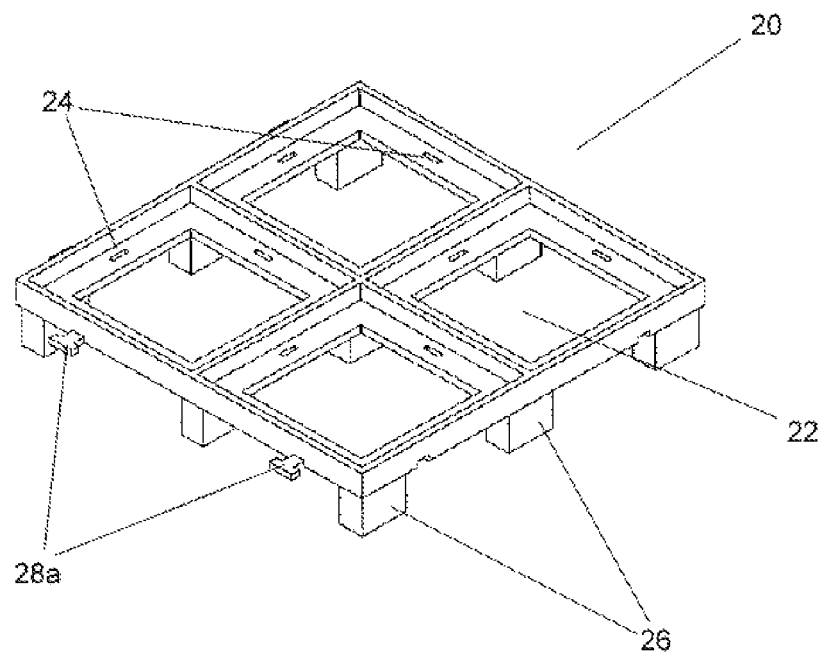
FIG. 2 shows a perspective view of a frame according to the preferred embodiment of the present invention.
Figure 3:
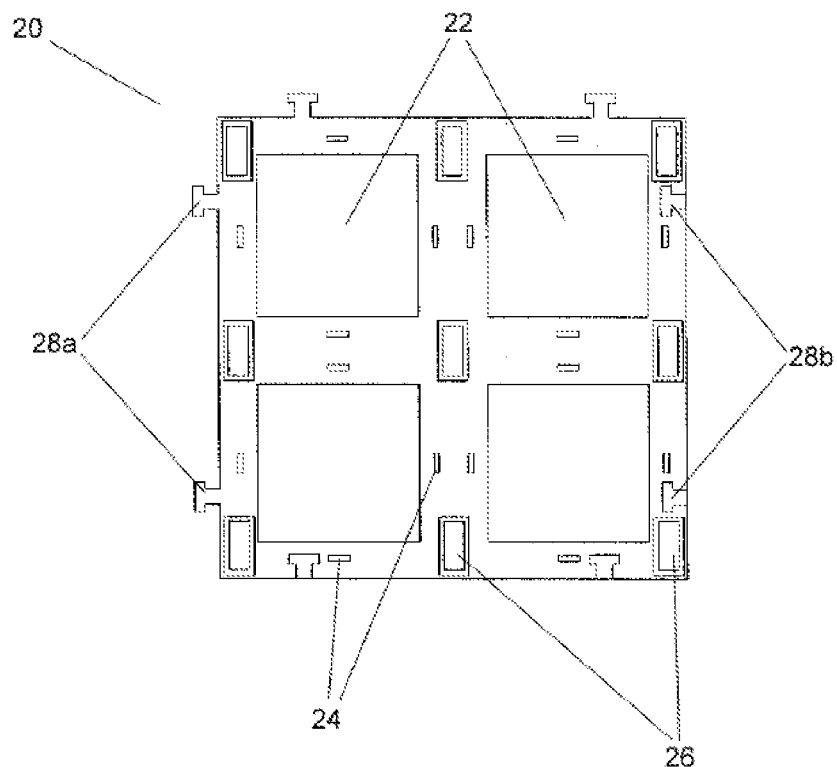
FIG. 3 shows a bottom view of the frame shown in FIG. 2.

Regarding FIGS. 2 and 3, a frame 20 can be seen according to the preferred embodiment of the invention. The frame 20 presents a square form, and defines four openings 22 therein. In the periphery of each opening 22 there are four grooves 24, which serve to provide a clip attachment with a filter assembly as described below herein.

The edges of the openings are arranged on a plane slightly below the level of the upper plane side of the frame, so that once arranged the filter assemblies onto the edges of the corresponding openings 22, the upper surface of the filtering equipment of the invention is substantially coplanar.

It can be seen that the frame 20 further presents a plurality of housings 26 which project downward, each of which arranged for housing a leg 10 of the type described above with reference to FIG. 1. Finally, as better seen in FIG. 3, two adjacent sides of the frame 20 have a pair of protuberances 28a, each in the form of a T, while the opposite sides have a pair of recesses 28b, each, also in the form of a T. Such protuberances 28a and recesses 28b allow therefore the coupling between two adjacent frames 20, introducing the protuberances 28a of a frame 20 in the recesses 28b of the adjacent frame 20. This enables the coupling of any number of frames 20 required to completely cover the bottom of a given open filter, providing thus the aforementioned double bottom required for filtering in any filter material.

Figure 4:
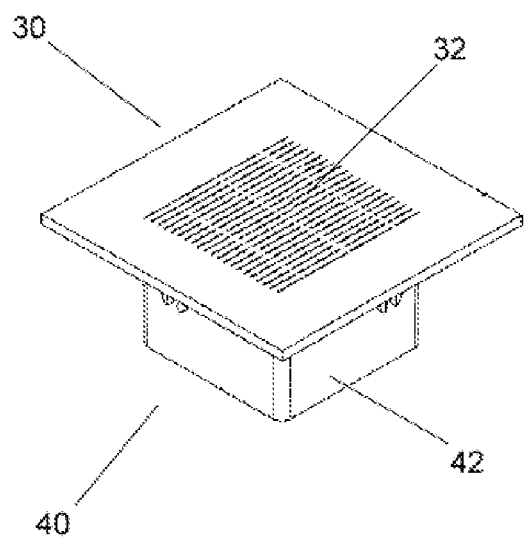
FIG. 4 shows a perspective view of a filtering assembly according to the preferred embodiment of the present invention.
Figure 5:
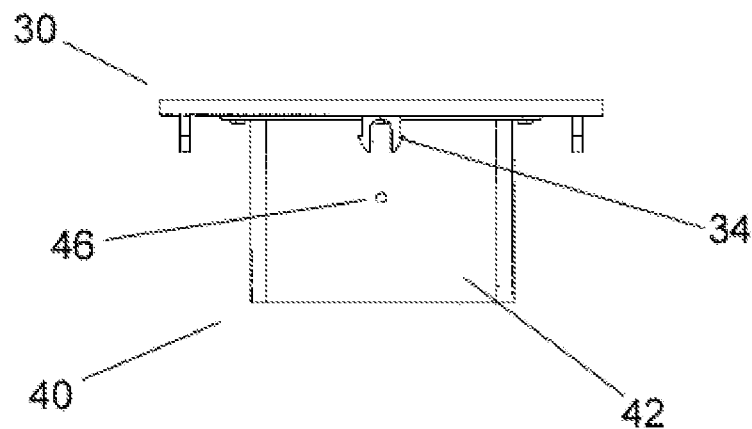
FIG. 5 shows a side view of the filtering assembly shown in FIG. 4.

With reference to both FIGS. 4 and 5, a filtering assembly according to the preferred embodiment of the invention can be seen. Although different components are shown coupled to form a filtering assembly according to this embodiment of the invention each filtering assembly is actually constituted by a filtering slab 30 and a skirt body 40 with a closed cross section.

Figure 6:
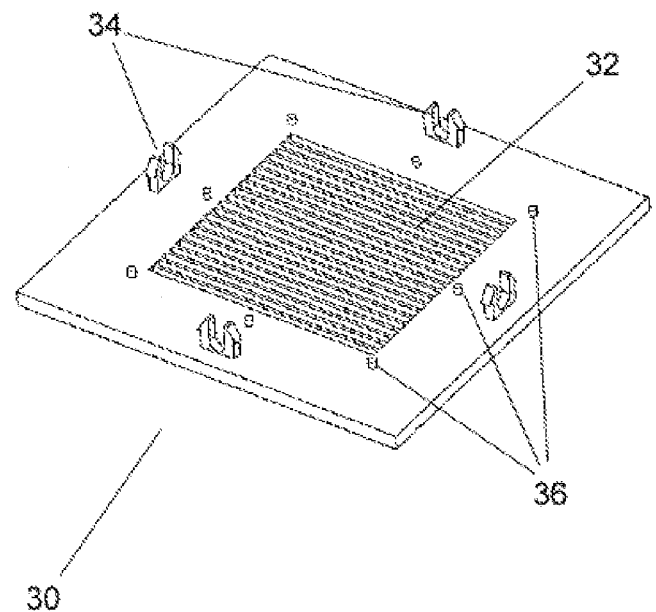
FIG. 6 shows a bottom perspective view of a filtering slab according to the preferred embodiment of the present invention.

Further referring to FIG. 6, each filtering plate 30 comprises a flat upper surface and its thickness is selected so that, when attaching the slabs 30 onto the frames 20 to cover their openings 22, said flat surface remains coplanar with the upper side of the corresponding frame, so that the upper surface of the filtering equipment assembly is substantially flat without any element protruding vertically from the false bottom formed.

In its central area, the filtering slab 30 comprises a filtering grid 32 wherethrough the water is separated from the filter bed by filtering. Furthermore, the filter slab 30 comprises on its lower surface four flexible lugs 34 which are attached in the above herein described grooves 24 of a frame 20. As a person skilled in the art can easily understand, said flexible lugs 34, thanks to their inclined section at the end, deform slightly toward each other when inserted into the grooves 24. Once introduced into the grooves 24, they recover their original form and, thanks to the provided step at the end of the inclined section, the accidental removal of the lugs 34 from the grooves 24 is prevented. Thus a clip attachment is provided between the slab 30 (and therefore the filtering assembly) and the corresponding frame 20, covering the opening 22 of the frame 20 by the slab 30, provided with the filtering grid 32.

Finally, as more particularly observed in FIG. 6, the slab 30 comprises a plurality of projections 36 also on its lower side (specifically in this case eight projections 36). Said projections 36 have the function of providing an attachment by pressure coupling with the skirt body 40, as described below herein.

Figure 7:
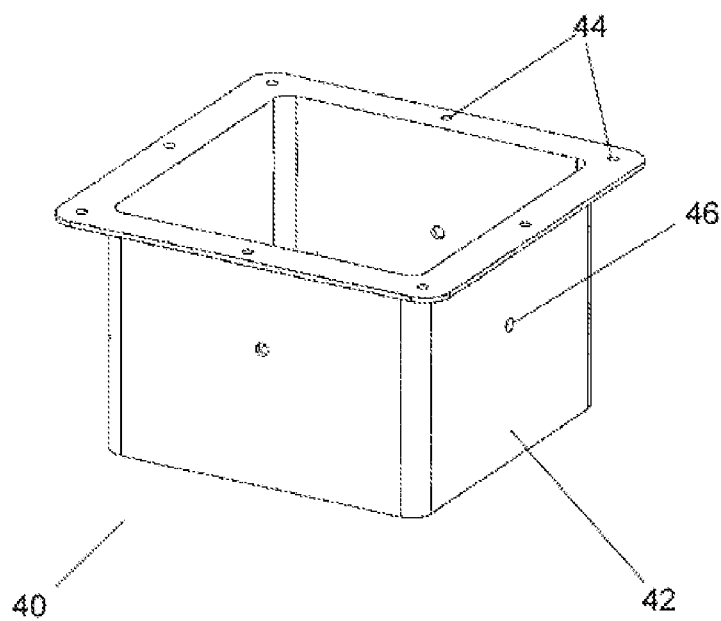
FIG. 7 shows a perspective view of a skirt body according to the preferred embodiment of the present invention.

Turning back to the FIGS. 4 and 5, and with further reference to FIG. 7, it can be seen a skirt body 40 according to the preferred embodiment of the present invention. Said skirt body 40 comprises at least a vertical wall 42 which, in this preferred embodiment of the invention amounts to a total of four walls which, once coupled the skirt body 40 to de slab 30, extends from the periphery of the filtering grid 32 downward, i.e., t the false bottom of the open filter.

However, these vertical walls 42 are preferably shorter than the above described support legs 10, and therefore fail to come into contact with the filter bottom. At its upper part, as seen in FIG. 7, said skirt body 40 further comprises a peripheral flat edge perpendicular to said vertical walls 42, wherein a plurality of holes 44 (eight, in this case) is disposed corresponding to the projections 36 of the slab 30. These holes 44 have the function of receiving the above described projections 36 of the slab 30 providing thus the attachment by pressure coupling between the filtering slab 30 and the skirt body 40.

Specifically, in the represented embodiment, the skirt body 40 remains suspended by the slab 30 elevated from the filter bottom.

Finally, it should be noted that the skirt body 40 also comprises four ventilation openings 46 (in this case, circular); specifically a ventilation opening 46 in each of the four vertical walls 42.

During a cleaning phase of the filtering equipment, air is usually introduced into the filter assembly from the bottom, (i.e., from the gap formed between the filter bottom and the upper surface of the filtering equipment), so that it reaches the lower side of the filtering grid 32 through the skirt body 40. The introduced air is used to clean the filter bed 32, throwing the filter bed and other particles upwards that, retained by the filter bed, have been deposited on the slabs.

The ventilation openings 46 communicate the air introduced in this cleaning phase, thus allowing the creation of an air chamber immediately below the frames 20 and the filtration slabs 30, so that the pressure exerted by the air on the filtering grids 32 stabilises and the passing of the air through all the filtering grids 32 becomes uniform, and therefore improving the cleaning of the filtering equipment as a whole.

Despite the fact that the present invention has been described with reference to a preferred embodiment thereof, it must be understood that the person skilled in the art may undertake changes and variations based on the teachings of the present document without therefore deviating from the scope of protection defined by the attached claims. For example, although a means of attachment between the filtering slab and the skirt body by a pressure coupling of projections in the corresponding holes, has been described, it should be understood that any other medium known by the prior art can be used to obtain a similar result, such as a coupling by means of screws between both elements, for instance.

Likewise, according to a further preferred embodiment of the invention, the filtering slab and the skirt body are provided as a single piece, called filtering assembly, for example connecting both elements by welding or directly manufacturing them directly in a single piece through injection moulding or any other technique widely known and used by the people skilled in the art.

Furthermore, these filtering assemblies can be provided interdependently forming a single piece with the above described frames, without therefore deviating from the spirit of the present invention.

According to other preferred embodiments of the invention, coupling means are provided between the various elements of the filtering equipment described in the present invention (support leg and frame, filtering assembly and frame, etc.) different from the clip attachments previously described herein, such as any means of mechanical coupling known by the people skilled in the art (male-female coupling, pressure attachment, screws, bolts, . . . ).

Likewise, although in the preferred embodiment of the present invention described with reference to the attached figures the various elements mainly present square forms (frames, openings, filtering slabs, skirt bodies, etc.), it is clear that these elements may present any other suitable form (polygonal, circular, cylindrical, . . . ) without therefore deviating from the present invention. However, the form defined by the periphery of the frames is preferably polygonal (square, pentagonal, hexagonal, . . . ), and not circular, in order to enable the coupling between a plurality of frames covering the whole bottom of an open filter.

Nevertheless, the height and passage cross section of these ventilation openings do present preferred values which obtain the expected advantageous technical effect. They constitute therefore important facts for the proper functioning of these openings, so that they perform as expected. Therefore, to vary the size, section, or height of the holes can result in their malfunction, which may be caused by a difficulty of air passage or blockages of the holes that can be covered with water in the event that their height is too reduced, in which case, they do not perform the function for which they have been created.

That which may vary is the closed cross section of the skirt body, which in this preferred embodiment of the invention comprises a square cross section, but it is also possible that it comprises a circular cross section, for instance. In this case, the skirt body with a circular cross section, despite the fact of only presenting a vertical cylindrical wall, will comprise at least four ventilation openings, located equidistantly therein.

Finally, as is evident for those skilled in the art, the size and number of openings in the frames may vary in alternative embodiments of the present invention without deviating from the inventive concept thereof.

The invention claimed is:

1. An open filtering apparatus for a water treatment station configured with open filters and filter beds, the open filtering apparatus comprising:
a plurality of frames each frame defining at least one opening, said plurality of frames configured to support a filter;
a plurality of support legs configured to support the plurality of frames, the support legs including rectangular prismatic bodies, the rectangular prismatic bodies including a pair of projections and flexible lugs on one end configured to provide a pressure coupling and a clip attachment, respectively, with at least one of the plurality of frames; and
a plurality of filtering assemblies with a flat upper surface, each filtering assembly being attachable to at least one of the plurality of frames such that the filtering assembly covers the defined at least one opening, each filtering assembly including a filtering grid configured for separating water from a filter bed during filtering,
wherein the plurality of frames include support surfaces at their respective edges for supporting the filtering assemblies, the support surfaces arranged below respective upper surfaces of the plurality of frames, and
wherein the plurality of filtering assemblies and the upper surfaces of the plurality of frames are configured such that a flat upper surface of the plurality of filtering assemblies is coplanar with the upper surfaces of the plurality of frames when the plurality of filtering assemblies are coupled to a corresponding frame of the plurality of frames.

2. The open filtering apparatus according to claim 1, wherein each filtering assembly further comprises a skirt body including a closed cross section defined by at least one vertical wall extending from a periphery of the filtering grid towards the bottom of the filter when the filtering assemblies are operatively positioned for filtering, the at least one vertical wall of the skirt body including at least one ventilation opening for allowing air to be introduced during a filter cleaning phase.

3. The open filtering, apparatus according to claim 2, wherein the skirt body is a tubular shape, such that the vertical wall is cylindrical and includes at least four ventilation openings spaced equidistantly about the circumference of the vertical wall.

4. The open filtering apparatus according to claim 1, wherein each filtering assembly includes a substantially flat upper filter slab and a skirt body that are independent from and coupled to each other, the coupling between the filter slab and the skirt body including projections arranged on a lower surface of the filter slab near the periphery of the filtering grid and holes arranged on an upper surface of the skirt body configured to receive the projections to allow the coupling between the filtering slab and the skirt body.

5. The open filtering apparatus according claim 1, wherein each filter assembly is coupled to a frame by clip attachments.

6. The open filtering apparatus according to claim 1, wherein each frame is attached to another of the plurality of frames such that a single unit is formed with the filtering assemblies covering each of the openings defined by the plurality of frames.

7. The open filtering apparatus according to claim 1, wherein each frame defines a square shape having sides, two sides of each frame including protuberances and two other sides of each frame including recesses corresponding to said protuberances, the recesses and protuberances allowing the coupling between at least two of the plurality of frames by the introduction of the protuberances of a first frame into the recesses of another adjacent frame.

8. The open filtering apparatus according to claim 7, wherein each frame comprises four openings each arranged to be covered by a filtering assembly.

9. The open filtering apparatus according to claim 7, wherein each frame further includes four grooves located near the periphery of each opening for providing a clip attachment to a filter assembly.

10. The open filtering apparatus according to claim 9, wherein the filter slab includes four flexible lugs on a lower surface that are attached in the grooves of the frame.

11. The open filtering apparatus according to claim 1, wherein each frame further includes a plurality of housings that project downward, each housing being configured to receive at least one of the plurality of support legs.

* * * * *